United States Patent
Kubota et al.

(10) Patent No.: US 8,941,930 B2
(45) Date of Patent: Jan. 27, 2015

(54) IMAGING LENS AND IMAGING DEVICE

(71) Applicants: Optical Logic Inc., Ina-shi, Nagano (JP); Kantatsu Co., Ltd., Yaita-shi, Tochigi (JP)

(72) Inventors: Yoji Kubota, Ina (JP); Kenichi Kubota, Ina (JP); Hitoshi Hirano, Ina (JP); Ichiro Kurihara, Yaita (JP); Yukio Sekine, Yaita (JP)

(73) Assignees: Optical Logic Inc., Nagano (JP); Kantatsu Co., Ltd., Tochigi (JP)

( * ) Notice: Subject to any disclaimer, the term of this patent is extended or adjusted under 35 U.S.C. 154(b) by 59 days.

(21) Appl. No.: 13/760,568

(22) Filed: Feb. 6, 2013

(65) Prior Publication Data

US 2013/0222675 A1  Aug. 29, 2013

(30) Foreign Application Priority Data

Feb. 28, 2012 (JP) ................................ 2012-040878

(51) Int. Cl.
  *G02B 13/18*  (2006.01)
  *G02B 3/02*  (2006.01)
  *G02B 9/12*  (2006.01)
  *G02B 13/00*  (2006.01)

(52) U.S. Cl.
  CPC ............ *G02B 13/0035* (2013.01); *G02B 13/18* (2013.01); *G02B 9/12* (2013.01)
  USPC ............ 359/716; 359/708; 359/784; 359/792

(58) Field of Classification Search
  CPC ....... G02B 9/12; G02B 13/0035; G02B 13/18
  USPC .......................................... 359/716, 784, 792
  See application file for complete search history.

(56) References Cited

U.S. PATENT DOCUMENTS

| | | | | |
|---|---|---|---|---|
| 6,961,191 B2 * | 11/2005 | Sato | ............................... | 359/785 |
| 7,085,077 B1 * | 8/2006 | Noda | ............................ | 359/784 |
| 7,423,820 B2 * | 9/2008 | Taniyama | ..................... | 359/791 |
| 7,443,613 B2 * | 10/2008 | Noda | ............................ | 359/784 |
| 7,477,461 B2 * | 1/2009 | Bareau et al. | ................. | 359/785 |
| 7,564,635 B1 * | 7/2009 | Tang | .............................. | 359/792 |
| 7,894,142 B1 * | 2/2011 | Tang et al. | ..................... | 359/792 |
| 8,339,715 B2 * | 12/2012 | Shih et al. | ..................... | 359/716 |
| 2013/0222927 A1 * | 8/2013 | Kubota et al. | ................. | 359/716 |

FOREIGN PATENT DOCUMENTS

JP  2012-014139 A  1/2012

* cited by examiner

*Primary Examiner* — Thomas K Pham
*Assistant Examiner* — Nicholas Pasko
(74) *Attorney, Agent, or Firm* — Kubotera & Associates, LLC

(57) ABSTRACT

An imaging lens includes a first lens; a second lens; and a third lens arranged from an object side to an image plane side. The first lens has an object-side surface with a positive curvature radius. The second lens has an object-side surface and an image plane-side surface with negative curvature radii. The third lens has an object-side surface and an image plane-side surface with positive curvature radii. The object-side surface and the image plane-side surface of the third lens are respectively formed as an aspheric shape having an inflexion point. When the whole lens system has a focal length f, the first lens has a focal length f1, the second lens has a focal length f2, and the third lens has a focal length f3, the imaging lens satisfies the following conditional expressions:

$f1 < f2$ $1.0 < f1/f < 1.5$ $0.7 < f2/f3 < 1.2.$

6 Claims, 15 Drawing Sheets

IMAGING LENS AND IMAGING DEVICE

BACKGROUND OF THE INVENTION AND RELATED ART STATEMENT

The present invention relates to an imaging lens for forming an image of an object on an imaging element such as a CCD sensor and a CMOS sensor, and particularly, it relates to an imaging lens suitable for mounting in a relatively small camera such as a cellular phone, a digital still camera, a portable information terminal, a security camera, a vehicle onboard camera, and a network camera, and an imaging device equipped with the imaging lens.

In these years, in place of cellular phones that are intended mainly for making phone calls, so-called "smart phones" have been more widely used, i.e., cellular phones with such functions as those of portable information terminals (PDA) and/or personal computers. Since the smart phones generally are highly functional as opposed to the cellular phones, it is possible to use images taken by a camera thereof in various applications. For example, in case of the smart phone, while it is possible to use for printing and enjoying images taken as of its intended use, it is also possible to use in additional uses such as processing images to be used in games or for makeup simulations, dress fitting simulations, and the others. Such uses of the images, which were not conventionally common, are becoming increasingly popular every year.

Generally speaking, an imaging lens to be mounted in the cellular phone or the smart phone, which is developed for advanced users, is required to have a high resolution lens configuration so as to be also applicable to a high pixel count imaging element of these days. However, as the imaging lens to be mounted in a camera used for the above-described usages, it is critical to be a small size with a wide angle of view, that is, a wide angle, than having a high resolution.

Conventionally, there have been proposed various lens configurations, and among them, an imaging lens having a three lens configuration has been used in a number of cameras because of its relatively satisfactory ability of correcting aberrations and suitability for downsizing. As the three-lens configuration, there has been a well-known lens configuration, which includes a first lens having positive refractive power; a second lens having negative refractive power; and a third lens having positive or negative refractive power. In the lens configuration, since the second lens has negative refractive power, a chromatic aberration occurred in the first lens is suitably corrected through the second lens and it is suitable for downsizing of the imaging lens.

However, in the lens configuration, since the second lens has negative refractive power, when it is attempted to attain both downsizing of the imaging lens and a wider angle, refractive power of each lens tends to be relatively strong. As a result, it is necessary to improve the fabrication accuracy and assembly accuracy of the lenses. For this reason, there has been recently proposed a lens configuration, in which refractive powers of all of the three lenses are positive.

As the imaging lens having the three-lens configuration, for example, an imaging lens described in Patent Reference has been known. According to the imaging lens, downsizing of the imaging lens and a wider angle are attained, while correcting aberrations by providing an inflexion point in the second lens and the third lens.
Patent Reference: Japanese Patent Application Publication No. 2012-14139

According to the imaging lens described in Patent Reference, it is possible to attain downsizing of the imaging lens while correcting aberrations to some extent. In the imaging lens, however, since the whole lens system has a long focal length, a length on an optical axis tends to be long and it is difficult to fully meet the recent demands for downsizing. In addition, with diversification of camera uses, imaging lenses are demanded to have even wider angles. Although the imaging lens described in Patent Reference has the wider angle of view than that of conventional one, there is a limit by itself for attaining even a wider angle.

Here, a difficulty of attaining both downsizing and the wider angel while satisfactory correcting aberrations is not a problem specific to the imaging lens to be mounted in cellular phones and smart phones. Rather, it is a common problem even for an imaging lens to be mounted in a relatively small camera such as digital still cameras, portable information terminals, security cameras, onboard cameras, and network cameras.

In view of the above-described problems in conventional techniques, an object of the present invention is to provide an imaging lens that can attain downsizing and a wider angle while satisfactorily correcting aberrations, and an imaging device equipped with the imaging lens.

Further objects and advantages of the invention will be apparent from the following description of the invention.

SUMMARY OF THE INVENTION

In order to attain the objects described above, according a first aspect of the present invention, an imaging lens includes a first lens having positive refractive power; a second lens having positive refractive power; and a third lens having positive refractive power, arranged in the order from an object side to an image plane side. The first lens has an object-side surface, a curvature radius of which is positive. The second lens has an object-side surface and an image plane-side surface, curvature radii of which are both negative. The third lens has an object-side surface and an image plane-side surface, curvature radii of which are both positive. The object-side surface and the image plane-side surface of the third lens are respectively formed as an aspheric shape having an inflexion point.

According to the first aspect of the present invention, when the whole lens system has a focal length f, the first lens has a focal length f1, the second lens has a focal length f2, and the third lens has a focal length f3, the imaging lens of the invention satisfies the following conditional expressions (1) to (3):

$$f1 < f2 \tag{1}$$

$$1.0 < f1/f < 1.5 \tag{2}$$

$$0.7 < f2/f3 < 1.2 \tag{3}$$

As described above, according to the imaging lens having the three-lens configuration, in which the second lens has negative refractive power, in an attempt to attain both downsizing of the imaging lens and the wide angle, each lens tends to have relatively strong refractive power. Consequently, it is necessary to enhance fabrication accuracy and assembly accuracy of the lens.

According to the first aspect of the present invention, since each of the first to third lenses has positive refractive power, so that it is possible to increase the refractive power of the whole lens system although each lens has relatively weak refractive power. Accordingly, it is possible to satisfactorily attain downsizing and a wide angle. Furthermore, since each lens composing the imaging lens has relatively weak refractive power, each lens are able to be formed in a gentle surface shape, and thereby it is achievable to improve the workability and the ease of assembly of the imaging lens.

As shown in the conditional expression (1), according to the imaging lens of the present invention, the second lens has weak refractive power relative to the first lens. In addition, as shown in the conditional expression (3), according to the imaging lens, the second lens and the third lens have similar refractive powers, and aberrations are corrected in the second lens and the third lens. According to the imaging lens of the invention, the second lens is formed in a shape such that a curvature radius of the object-side surface thereof and a curvature radius of the image plane-side surface thereof are both negative, and the third lens is formed in a shape such that a curvature radius of the object-side surface thereof and the image plane-side surface thereof are both positive. The third lens has aspheric surfaces, and the object-side surface thereof and the image plane-side surface thereof respectively have an inflexion point. Due to such surface shapes of the second lens and the third lens, it is achievable to satisfactorily correct the image surface and aberrations, and it is also achievable to suitably restrain an incident angle of a light beam emitted from the imaging lens to an imaging element.

When the imaging lens satisfies the conditional expression (2), it is achievable to shorten a length (thickness) on an optical axis of the imaging lens while restraining the incident angle of a light beam emitted from the imaging lens to the imaging element within a certain range, and attain downsizing of the imaging lens.

When the value exceeds the upper limit of "1.5", since the first lens has relatively weak refractive power, a position of an exit pupil moves in a direction to be away from the image plane. For this reason, although it is achievable to easily restrain the incident angle of a light beam emitted from the imaging lens to the imaging element within a certain range and it is possible to easily restrain generation of a spherical aberration, it is difficult to attain downsizing of the imaging lens. In addition, since the second lens and the third lens have relatively strong refractive powers, it is difficult to restrain a chromatic aberration of magnification within a satisfactory range.

On the other hand, when the value is below the lower limit of "1.0", since the first lens has relatively strong refractive power, the position of the exit pupil moves in a direction to be close to the image plane. For this reason, although it is advantageous for downsizing of the imaging lens, it is difficult to restrain the incident angle of a light beam emitted from the imaging lens to the imaging element within a certain range.

When the imaging lens satisfies the conditional expression (3), it is possible to restrain a field curvature while restraining the incident angle of a light beam emitted from the imaging lens to the imaging element within a certain range. When the value exceeds the upper limit of "1.2", the third lens has strong refractive power, and it is difficult to restrain the field curvature, and at the same time, it is difficult to restrain the incident angle of a light beam emitted from the imaging lens to the imaging element within a certain range. Moreover, since the distortion increases, it is difficult to obtain satisfactory image-forming performance.

On the other hand, when the value is below the lower limit of "0.7", since the position of the exit pupil moves in a direction to be away from the image plane, it is advantageous for correcting the distortion, and also it is achievable to easily restrain the incident angle of a light beam emitted from the imaging lens to the imaging lens within a certain range. Also in this case, however, it is difficult to restrain the field curvature, and it is difficult to obtain satisfactory image-forming performance.

According to a second aspect of the present invention, when a composite focal length of the second lens and the third lens is f23, the imaging lens having the above-described configuration preferably satisfies the following conditional expression (4):

$$0.02 < f1/f23 < 0.1 \quad (4)$$

When the imaging lens satisfies the conditional expression (4), it is achievable to restrain a chromatic aberration and an astigmatism within preferred ranges while restraining the incident angle of a light beam emitted from the imaging lens to the imaging element within a certain range, and it is possible to attain downsizing of the imaging lens. When the value exceeds the upper limit of "0.1", since the first lens has relatively weak refractive power, the position of the exit pupil moves in a direction to be away from the image plane. Consequently, it is achievable to easily restrain the incident angle of a light beam emitted from the imaging lens to the imaging element within a certain range and it is advantageous for correcting a chromatic aberration, but the astigmatism increases and it is difficult to obtain satisfactory image-forming performance.

On the other hand, when the value is below the lower limit of "0.02", since the first lens has relatively strong refractive power, the position of the exit pupil moves in a direction to be close to the image plane. For this reason, although it is advantageous for downsizing of the imaging lens, the axial chromatic aberration is insufficiently corrected (a focal position at a short wavelength moves to the object side in relative to a focal position at a reference wavelength) and it is difficult to obtain satisfactory image-forming performance. In addition, it is difficult to restrain the incident angle of a light beam emitted from the imaging lens to the imaging element within a certain range.

According to a third aspect of the present invention, when a curvature radius of an image plane-side surface of the second lens is R2r and a curvature radius of an object-side surface of the third lens is R3f, the imaging lens having the above-described configuration preferably satisfies the following conditional expression (5):

$$-2.0 < R2r/R3f < -0.8 \quad (5)$$

When the imaging lens satisfies the conditional expression (5), it is achievable to restrain aberrations within preferred ranges, while restraining the incident angle of a light beam emitted from the imaging lens to the imaging element within a certain range. When the value exceeds the upper limit of "−0.8", since the third lens has relatively weak refractive power, it is difficult to restrain the incident angle of a light beam emitted from the imaging lens to the imaging element within a certain range. In addition, a chromatic aberration of magnification is insufficiently corrected (an image-forming point at a short wavelength moves in a direction to be close to an optical axis in relative to an image-forming point at a reference wavelength) and the image surface curves towards the object side, it is difficult to obtain satisfactory image-forming performance.

On the other hand, when the value is below the lower limit of "−2.0", since the third lens has relatively strong refractive power, it is easy to restrain the incident angle of a light beam emitted from the imaging lens to the imaging element within a certain range, and it is easy to restrain the field curvature. However, a distortion of a complicated shape easily occurs and it is difficult to obtain satisfactory image-forming performance.

According to a fourth aspect of the present invention, when a distance on an optical axis from the image plane-side surface of the first lens to the object-side surface of the second lens is D12 and a distance on the optical axis from the image plane-side surface of the second lens to the object-side surface of the third lens is D23, the imaging lens having the above-described configuration preferably satisfies the following conditional expression (6):

$$0.2 < D23/D12 < 1.2 \qquad (6)$$

When the imaging lens satisfies the conditional expression (6), it is achievable to restrain aberrations within preferred ranges while attaining downsizing of the imaging lens. When the value exceeds the upper limit of "1.2", the image surface curves towards the object side, and the astigmatic difference increases. In addition, a chromatic aberration of an off-axis light beam is insufficiently corrected and it is difficult to obtain satisfactory image-forming performance. Here in this case, it is also difficult to correct the distortion.

On the other hand, when the value is below the lower limit of "0.2", since the position of the exit pupil moves in a direction to be close to the image plane, it is advantageous for downsizing of the imaging lens, but it is difficult to restrain the incident angle of a light beam emitted from the imaging lens to the imaging element within a certain range. In addition, the distortion increases in a positive direction and it is difficult to obtain satisfactory image-forming performance.

According to a fifth aspect of the present invention, when a curvature radius of the image plane-side surface of the first lens is negative and a curvature radius of the object-side surface of the first lens is R1f, and a curvature radius of the image plane-side surface of the first lens is R1r, the imaging lens having the above-describe configuration preferably satisfies the following conditional expression (7):

$$-0.1 < R1f/R1r < -0.01 \qquad (7)$$

When the imaging lens satisfies the conditional expression (7), it is achievable to restrain the astigmatism and the field curvature within preferred ranges while restraining the incident angle of a light beam emitted from the imaging lens to the imaging element within a certain range, and attain downsizing of the imaging lens. When the value exceeds the upper limit of "−0.01", since the position of the exit pupil moves in a direction to be close to the image plane, it is advantageous for downsizing of the imaging lens and correction of the astigmatism, but it is difficult to restrain the incident angle of a light beam emitted from the imaging lens to the imaging element within a certain range.

On the other hand, when the value is below the lower limit of "−0.1", since the position of the exit pupil moves in a direction to be away from the image plane, it is easy to restrain the incident angle of a light beam emitted from the imaging lens to the imaging element within a certain range, but it is difficult to attain downsizing of the imaging lens. Moreover, since the astigmatic difference increases and the image surface curves towards the object side, it is difficult to obtain satisfactory imaging performance.

According to a sixth aspect of the present invention, in the imaging lens having the above-described configuration, it is preferred to form the respective lenses from the first lens to the third lens of materials having Abbe's numbers greater than 50. Increasing the Abbe's number of any lens that composes the imaging lens, it is achievable to restrain generation of chromatic aberration.

Furthermore, according to a seventh aspect of the present invention, in the imaging lens having the above-described configuration, the respective lenses from the first lens to the third lens are preferably formed of the same material. Forming each lens of the same material, it is achievable to reduce the cost for materials of the imaging lens. Moreover, in a conventional style, for the imaging lens being composed by the lenses in which different types of material used, it used to require different types of the molds exclusively used for each material in its manufacturing, however, by limiting to one material, it enables to manufacture all the lenses composing the imaging lens with one mold. Therefore, it is achievable to improve the workability and the ease of assembly of the imaging lens, and at the same time, it is achievable to improve maintenance efficiency of the die, reduce costs related to the maintenance, etc., so that it is possible to suitably restrain the series of costs required in production of the imaging lens.

According to an eighth aspect of the present invention, an imaging device includes the imaging lens having the above-described configuration; and an image plane of an imaging element having a size of not greater than diagonal length of 3.6 mm and having resolution of not greater than 3 megapixel.

In these years, with downsizing of a camera, small-a sized imaging element has been mounted in the camera. Combining the imaging lens having the above-described configuration with the small-sized imaging element, it is achievable to restrain a sensitivity to deterioration of image-forming performance due to de-centering (axial displacement), tilting, etc. occurred upon production of the imaging lens, i.e. so-called manufacturing errors sensitivity. Moreover, it is achievable to restrain the field curvature and obtain stable image-forming performance in any image heights of the image plane of the imaging element in a balanced manner.

Now, when the second lens has negative refractive power as in the case of the conventional configuration, the manufacturing errors sensitivity tends to be high and it is difficult to restrain the manufacturing cost of the imaging lens. Moreover, although it is possible to improve a peak of the resolution of the imaging lens, since the resolution decreases near the median image height of the image plane of the imaging element, it is difficult to obtain stable image-forming performance that is balanced in any image heights. Therefore, combining the imaging lens having the above-described configuration with an imaging element having a size of not greater than ⅕ inch and resolution of not greater than 3 megapixel, it is achievable to suitably restrain the manufacturing cost of the imaging lens while satisfactorily correcting aberrations.

According to the imaging lens of the invention, it is possible to provide an imaging lens that can attain both downsizing and a wide angle while correcting aberrations, and an imaging device equipped with the imaging lens.

DETAILED DESCRIPTION OF PREFERRED EMBODIMENTS

Hereunder, referring to the accompanying drawings, embodiments of the present invention will be fully described.

FIGS. 1, 4, 7, 10, and 13 are schematic sectional views of imaging lenses in Numerical Data Examples 1 to 5 according to the embodiment, respectively. Since a basic lens configuration is the same among those Numerical Data Examples, the lens configuration of the embodiment will be described with reference to the illustrative sectional view of Numerical Data Example 1.

Figure 1:
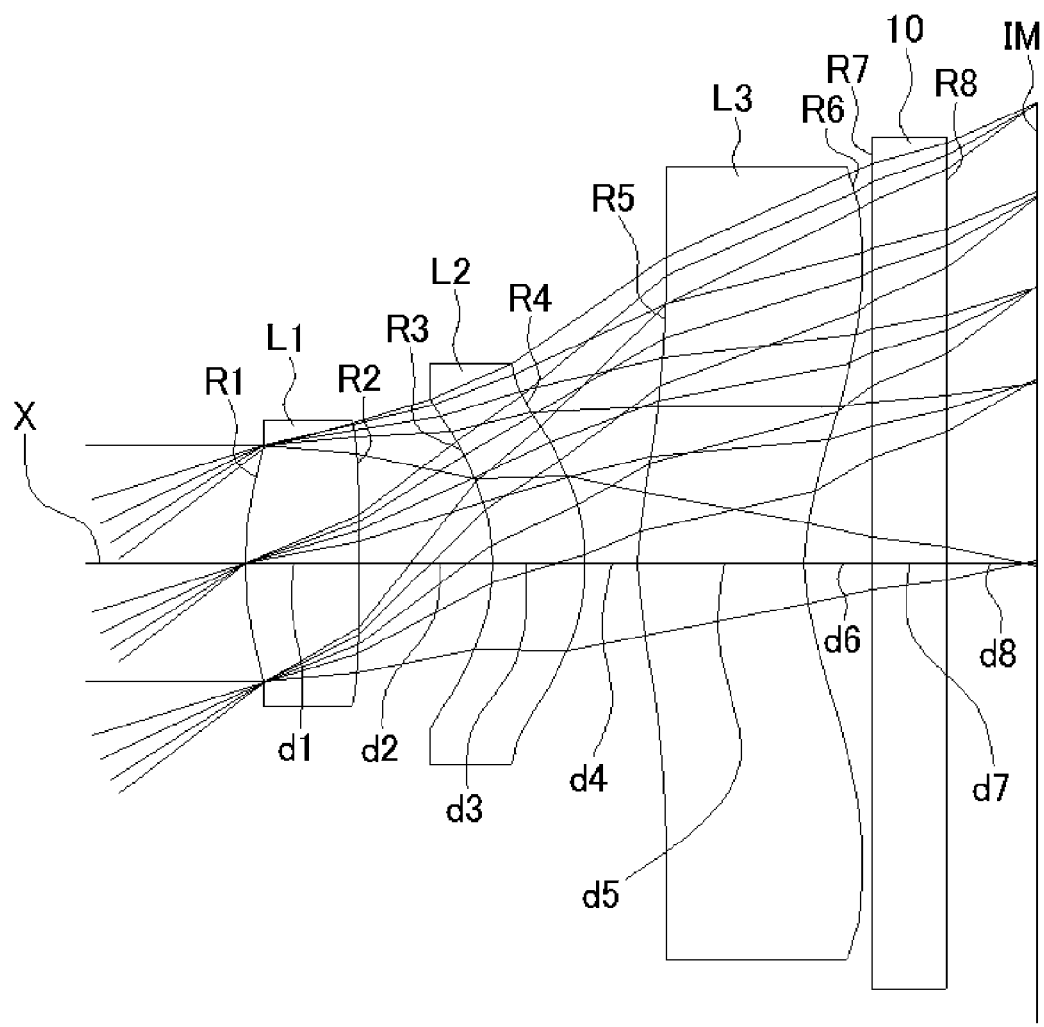
FIG. 1 shows a sectional view of a schematic configuration of an imaging lens in Numerical Data Example 1 according to an embodiment of the invention.

As shown in FIG. 1, the imaging lens of the embodiment includes a first lens L1 having positive refractive power, a second lens L2 having positive refractive power, and a third lens L3 having positive refractive power, arranged in the order from an object side to an image plane side. Those lenses from the first lens L1 to the third lens L3 are made of materials having Abbe's numbers of greater than 50. A filter 10 may be provided between the third lens L3 and an image plane IM of an imaging element. The filter 10 may be optionally omitted. In the imaging lens of the embodiment, there is provided an aperture stop on an object-side surface of the first lens L1.

The first lens L1 is formed in a shape such that a curvature radius R1 of an object-side surface thereof is positive and a curvature radius R2 of an image plane-side surface thereof is negative, and has a shape of a biconvex lens near an optical axis X. Here, the shape of the first lens L1 is not limited to the one in this embodiment. The shape of the first lens L1 can be any as long as the curvature radius R1 of the object-side surface thereof is positive, and can be a shape in which the curvature radius R1 and the curvature radius R2 are both positive, i.e. a shape of a meniscus lens directing a convex surface thereof to the object side near the optical axis X. Numerical Data Example 1 to 4 are examples, in which the first lens L1 has a shape of a biconvex lens near the optical axis X, and Numerical Data Example 5 is an example, in which the first lens L1 is formed in a shape of a meniscus lens directing a convex surface thereof to the object side near the optical axis X.

The second lens L2 is formed in a shape such that a curvature radius R3 of an object-side surface thereof and a curvature radius R4 of an image plane-side surface thereof are both negative, and has a shape of a meniscus lens directing a concave surface thereof to the object side near the optical axis X. The third lens L3 is formed in a shape such that a curvature radius R5 of an object-side surface thereof and a curvature radius R6 of an image plane-side surface thereof are both positive, and has a shape of a meniscus lens directing a convex surface thereof to the object side near the optical axis X. Among them, the third lens L3 has an aspheric shape, and has an inflexion point respectively on the object-side surface thereof and the image plane-side surface thereof. With such surface shapes of the third lens L3, it is achievable to suitably restrain the incident angle of a light beam emitted from the imaging lens to the image plane IM within a certain range.

The imaging lens of the embodiment satisfies the following conditional expressions (1) to (7):

$$f1 < f2 \quad (1)$$

$$1.0 < f1/f < 1.5 \quad (2)$$

$$0.7 < f2/f3 < 1.2 \quad (3)$$

$$0.02 < f1/f23 < 0.1 \quad (4)$$

$$-2.0 < R2r/R3f < -0.8 \quad (5)$$

$$0.2 < D23/D12 < 1.2 \quad (6)$$

$$-0.1 < R1f/R1r < -0.01 \quad (7)$$

In the above conditional expressions:
f: Focal length of the whole lens system
f1: Focal length of a first lens L1
f2: Focal length of a second lens L2
f3: Focal length of a third lens L3
f23: Composite focal length of the second lens L2 and the third lens L3
R1f: Curvature radius of an object-side surface of the first lens L1
R1r: Curvature radius of an image plane-side surface of the first lens L1
R2r: Curvature radius of an image plane-side surface of the second lens L2
R3f: Curvature radius of an object-side surface of the third lens L3
D12: Distance on the optical axis from an image plane-side surface of the first lens L1 to an object side surface of the second lens L2
D23: Distance on the optical axis from an image plane-side surface of the second lens L2 to the object-side surface of the third lens L3

Here, it is not necessary to satisfy all of the conditional expressions, and it is achievable to obtain an effect corresponding to the respective conditional expression when any single one of the conditional expressions is individually satisfied.

In the embodiment, all lens surfaces of the first lens L1 to the third lens L3 are formed as an aspheric surface. When the aspheric surfaces applied to the lens surfaces have an axis Z in a direction of the optical axis X, a height H in a direction perpendicular to the optical axis X, a conical coefficient k, and aspheric coefficients $A_4, A_6, A_8, A_{10}, A_{12}, A_{14},$ and $A_{16}$, a shape of the aspheric surfaces of the lens surfaces is expressed as follows:

$$Z = \frac{\frac{H^2}{R}}{1 + \sqrt{1 - (k+1)\frac{H^2}{R^2}}} + A_4 H^4 + A_6 H^6 +$$

$$A_8 H^8 + A_{10} H^{10} + A_{12} H^{12} + A_{14} H^{14} + A_{16} H^{16}$$

[Formula 1]

Next, Numerical Data Examples of the imaging lens of the embodiment will be described. In each Numerical Data Example, f represents a focal length of the whole lens system, Fno represents an F number, and ω represents a half angle of view, respectively. In addition, i represents a surface number counted from the object side, R represents a curvature radius, d represents a distance between lens surfaces (surface spacing) on the optical axis, Nd represents a refractive index for a d line (a reference wavelength), and νd represents Abbe's number for the d line, respectively. Here, aspheric surfaces are indicated with surface numbers i affixed with * (asterisk).

Numerical Data Example 1

Basic data are shown below.

f=1.64 mm, Fno=2.5, ω=38.1°

Unit: mm

Surface Data

| Surface Number i | R | d | Nd | νd |
|---|---|---|---|---|
| (Object) | ∞ | ∞ | | |
| 1* (Stop) | 1.041 (=R1f) | 0.318 | 1.5351 | 56.1 |
| 2* | −15.401 (=R1r) | 0.370 (=D12) | | |
| 3* | −0.611 | 0.259 | 1.5351 | 56.1 |
| 4* | −0.695 (=R2r) | 0.148 (=D23) | | |
| 5* | 0.776 (=R3f) | 0.465 | 1.5351 | 56.1 |
| 6* | 0.621 | 0.190 | | |
| 7 | ∞ | 0.210 | 1.5163 | 64.1 |
| 8 | ∞ | 0.252 | | |
| (Image plane) | ∞ | | | | f1 = 1.83 mm
f2 = 126.68 mm
f3 = 117.84 mm
f23 = 50.81 mm

Aspheric Surface Data

First Surface k = −1.508E+01, $A_4$ = 1.591, $A_6$ = −9.840, $A_8$ = 2.229E+01, $A_{10}$ = 7.877E+01, $A_{12}$ = −5.189E+02

Second Surface k = 0.000, $A_4$ = −3.757E−01, $A_6$ = 1.353, $A_8$ = −3.916E+01, $A_{10}$ = 1.541E+02, $A_{12}$ = −2.163E+02

Third Surface k = −2.561, $A_4$ = −2.251E−01, $A_6$ = −3.075E+01, $A_8$ = 3.819E+02, $A_{10}$ = −2.277E+03, $A_{12}$ = 8.130E+03, $A_{14}$ = −1.607E+04, $A_{16}$ = 1.208E+04

Fourth Surface k = 0.000, $A_4$ = −1.883, $A_6$ = 1.489E+01, $A_8$ = −6.497E+01, $A_{10}$ = 2.537E+02, $A_{12}$ = −3.266E+02, $A_{14}$ = −2.206E+02, $A_{16}$ = 4.651E+02

Fifth Surface k = −1.525E+01, $A_4$ = −8.208E−01, $A_6$ = 2.566, $A_8$ = −4.891, $A_{10}$ = 5.132, $A_{12}$ = −1.915, $A_{14}$ = −3.944E−01

Sixth Surface k = −5.459, $A_4$ = −5.241E−01, $A_6$ = 9.110E−01, $A_8$ = −1.055, $A_{10}$ = 3.162E−01, $A_{12}$ = 4.706E−01, $A_{14}$ = −3.897E−01, $A_{16}$ = 7.013E−02

The values of the respective conditional expressions are as follows:

f1/f=1.12 f2/f3=1.08 f1/f23=0.036

R2r/R3f=−0.90

D23/D12=0.40

R1f/R1r=−0.068

Accordingly, the imaging lens of Numerical Data Example 1 satisfies the above-described conditional expressions (1) to (7). A distance on the optical axis from the object-side surface of the first lens L1 to the image plane IM (length in air) is 2.14 mm, and downsizing of the imaging lens is attained. Here, the respective lenses that compose the imaging lens of Numerical Data Example 1 are made of the same material and the manufacturing cost of the imaging lens is suitably restrained.

Figure 2:
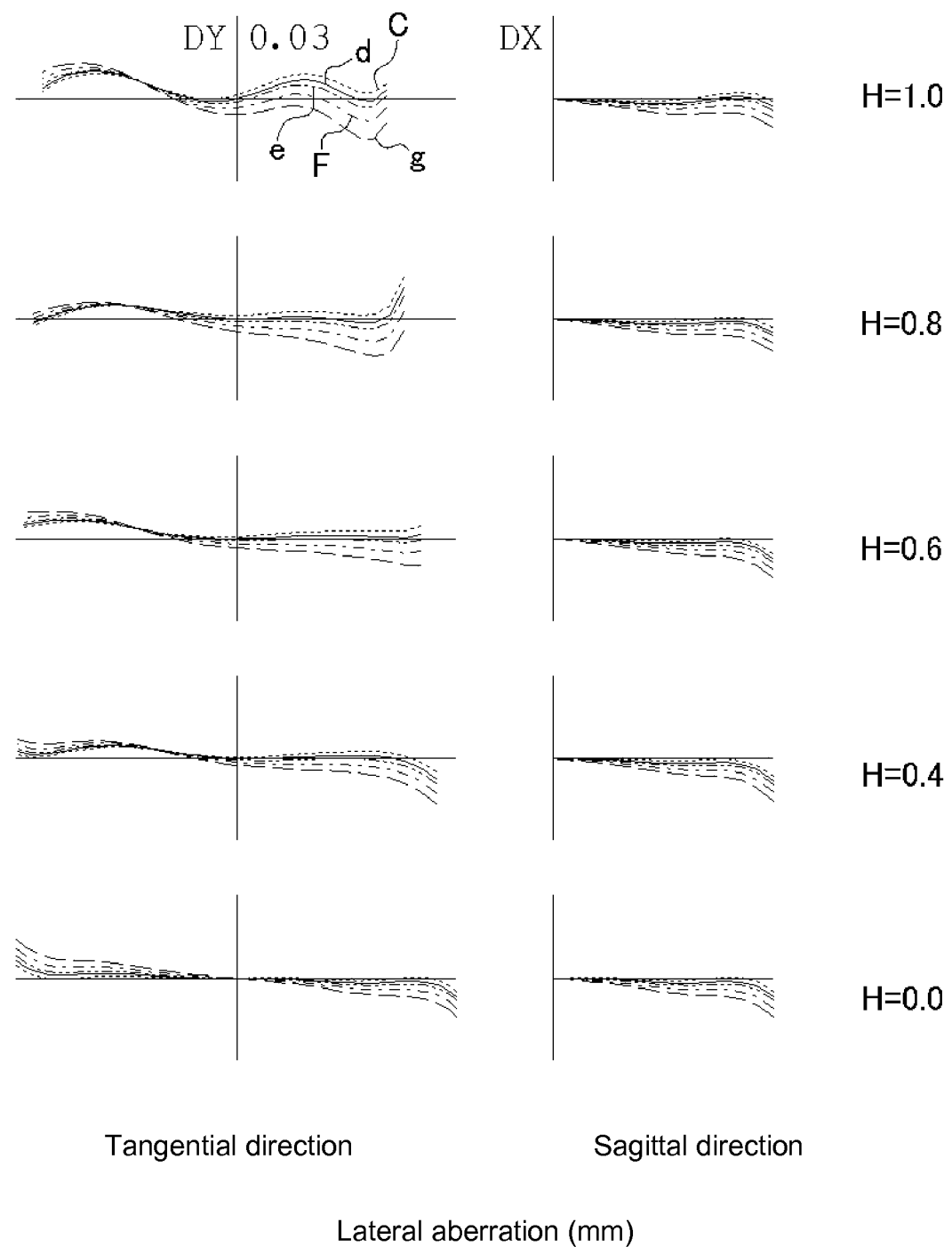
FIG. 2 is an aberration diagram showing a lateral aberration of the imaging lens of FIG. 1.
Figure 3:
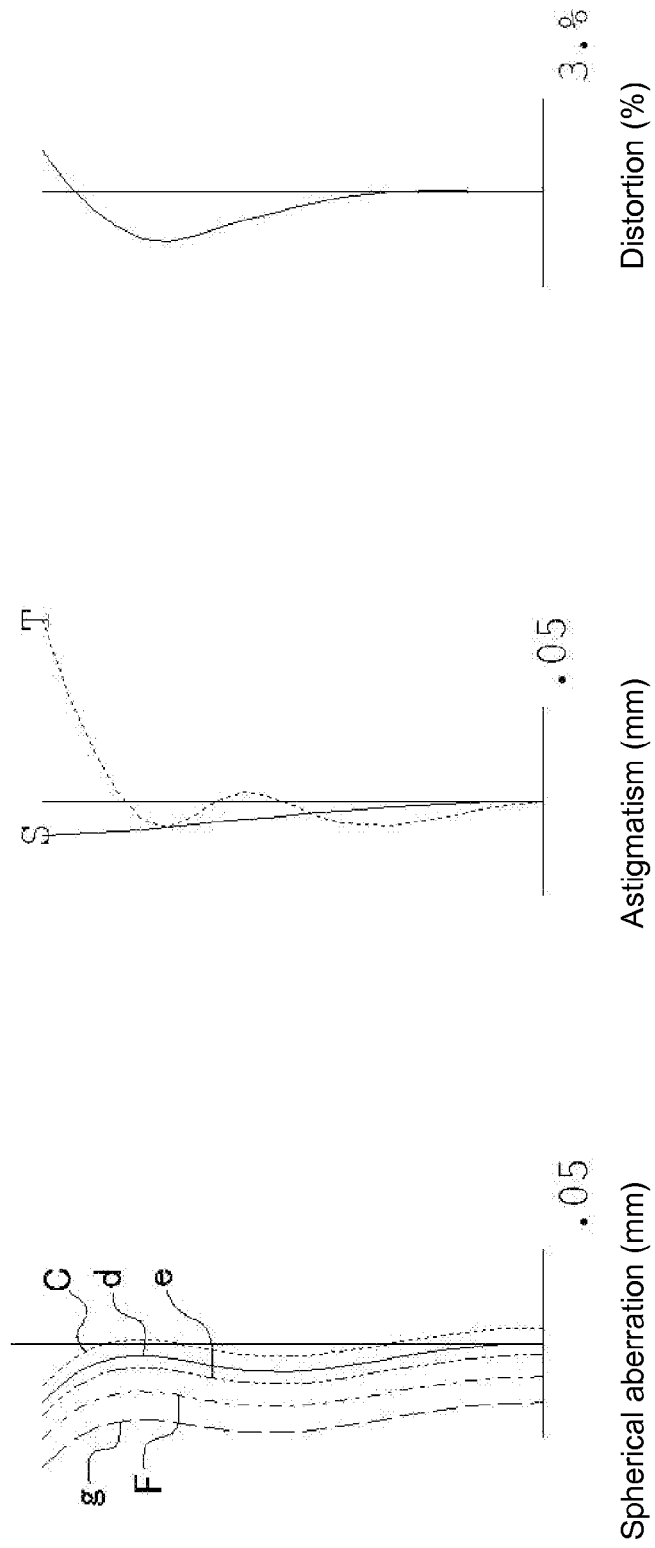
FIG. 3 is an aberration diagram showing a spherical aberration, astigmatism, and a distortion of the imaging lens of FIG. 1.
Figure 4:
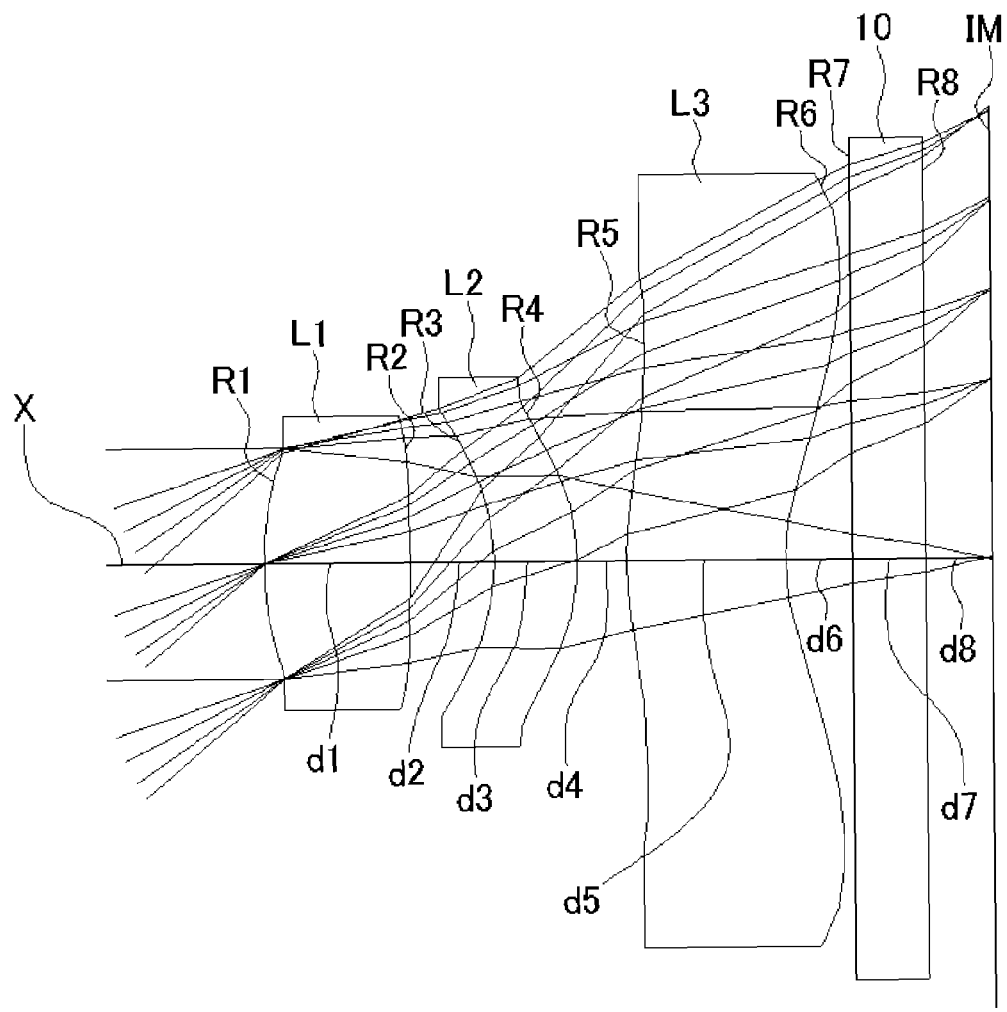
FIG. 4 shows a sectional view of a schematic configuration of an imaging lens in Numerical Data Example 2 according to the embodiment of the invention.

FIG. 2 shows a lateral aberration that corresponds to a ratio H of each image height to the maximum image height (hereinafter referred to as "image height ratio H"), which is divided into a tangential direction and a sagittal direction (which is the same in FIGS. 5, 8, 11, and 14). Furthermore, FIG. 3 shows a spherical aberration (mm), astigmatism (mm), and a distortion (%), respectively. In the aberration diagrams, for the lateral aberration diagrams and spherical aberration diagrams, aberrations at each wavelength, i.e. a g line (435.84 nm), an F line (486.13 nm), an e line (546.07 nm), a d line (587.56 nm), and a C line (656.27 nm) are indicated. In astigmatism diagram, an aberration on a sagittal image surface S and an aberration on a tangential image surface T are respectively indicated (which are the same in FIGS. 6, 9, 12, and 15). As shown in FIGS. 2 and 3, according to the imaging lens of Numerical Data Example 1, the aberrations are satisfactorily corrected.

Numerical Data Example 2

Basic data are shown below.

f=1.49 mm, Fno=2.3, ω=40.8°

Unit: mm

Surface Data

| Surface Number i | R | d | Nd | νd |
|---|---|---|---|---|
| (Object) | ∞ | ∞ | | |
| 1* (Stop) | 0.962 (=R1f) | 0.417 | 1.5351 | 56.1 |
| 2* | −27.232 (=R1r) | 0.242 (=D12) | | |
| 3* | −0.646 | 0.238 | 1.5351 | 56.1 |
| 4* | −0.707 (=R2r) | 0.141 (=D23) | | |
| 5* | 0.762 (=R3f) | 0.458 | 1.5351 | 56.1 |
| 6* | 0.621 | 0.190 | | |
| 7 | ∞ | 0.210 | 1.5163 | 64.1 |
| 8 | ∞ | 0.191 | | |
| (Image plane) | ∞ | | | | f1 = 1.75 mm
f2 = 39.12 mm
f3 = 47.17 mm
f23 = 17.86 mm

Aspheric Surface Data

First Surface k = −1.067E+01, $A_4$ = 1.738, $A_6$ = −9.620, $A_8$ = 1.964E+01, $A_{10}$ = 6.336E+01, $A_{12}$ = −3.091E+02

-continued

Unit: mm

Second Surface k = 0.000, $A_4$ = −3.948E−01, $A_6$ = 1.677, $A_8$ = −4.194E+01, $A_{10}$ = 1.390E+02, $A_{12}$ = −1.680E+02

Third Surface k = −3.154, $A_4$ = −2.334E−01, $A_6$ = −3.102E+01, $A_8$ = 3.822E+02, $A_{10}$ = −2.281E+03, $A_{12}$ = 8.090E+03, $A_{14}$ = −1.620E+04, $A_{16}$ = 1.300E+04

Fourth Surface k = 0.000, $A_4$ = −1.823, $A_6$ = 1.533E+01, $A_8$ = −6.304E+01, $A_{10}$ = 2.578E+02, $A_{12}$ = −3.210E+02, $A_{14}$ = −2.372E+02, $A_{16}$ = 2.748E+02

Fifth Surface k = −2.101E+01, $A_4$ = −7.804E−01, $A_6$ = 2.375, $A_8$ = −4.839, $A_{10}$ = 5.410, $A_{12}$ = −1.780, $A_{14}$ = −1.014

Sixth Surface k = −5.669, $A_4$ = −5.298E−01, $A_6$ = 9.530E−01, $A_8$ = −1.072, $A_{10}$ = 2.967E−01, $A_{12}$ = 4.616E−01, $A_{14}$ = −3.891E−01, $A_{16}$ = 7.646E−02

The values of the respective conditional expressions are as follows:

$f1/f=1.17$ $f2/f3=0.83$ $f1/f23=0.098$ $R2r/R3f=-0.93$ $D23/D12=0.58$ $R1f/R1r=-0.035$

Accordingly, the imaging lens of Numerical Data Example 2 satisfies the above-described conditional expressions (1) to (7). A distance on the optical axis from the object-side surface of the first lens L1 to the image plane IM (length in air) is 2.02 mm, and downsizing of the imaging lens is attained. Here, the respective lenses that compose the imaging lens of Numerical Data Example 2 are also made of the same material and the manufacturing cost of the imaging lens is suitably restrained.

Figure 5:
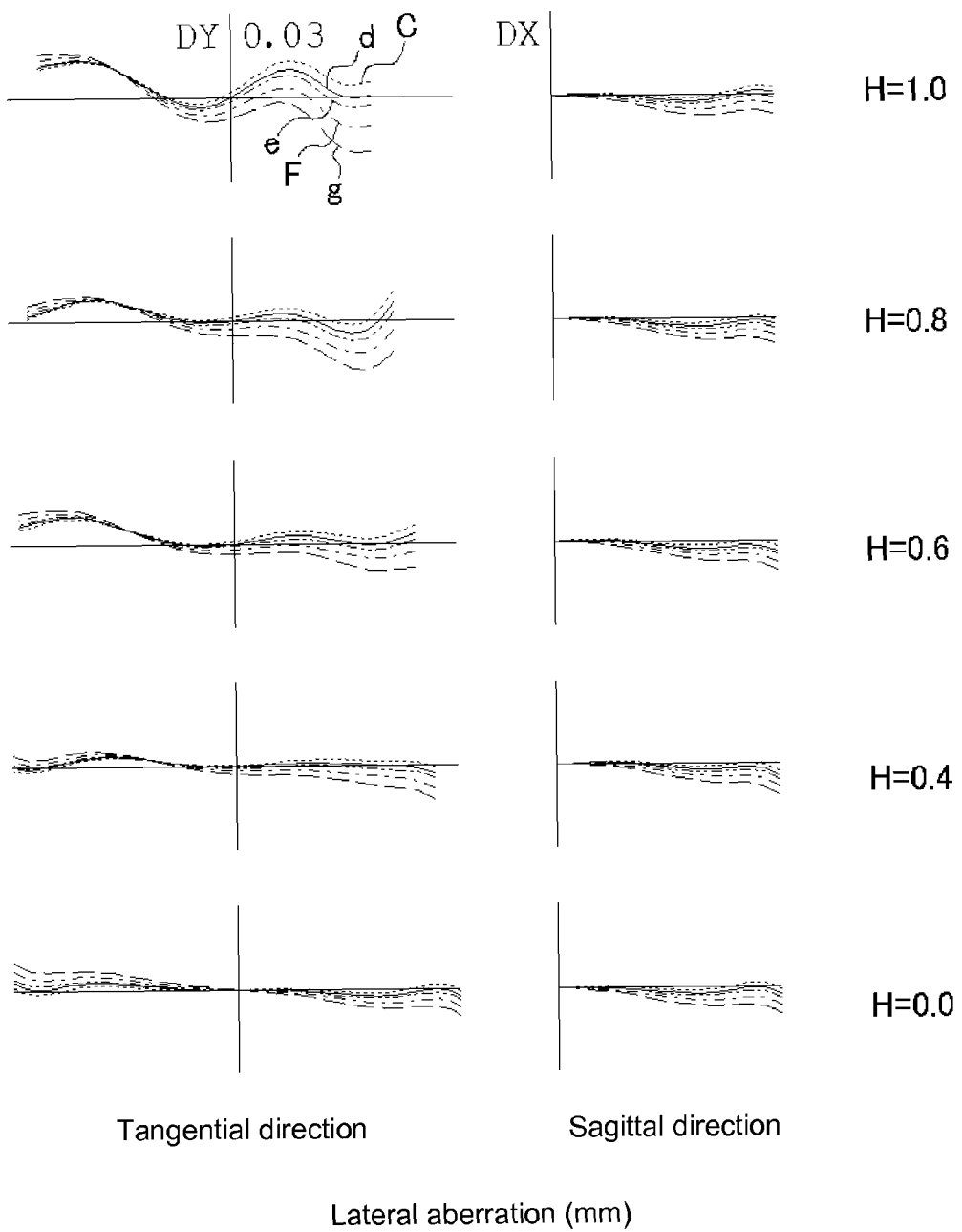
FIG. 5 is an aberration diagram showing a lateral aberration of the imaging lens of FIG. 4.
Figure 6:
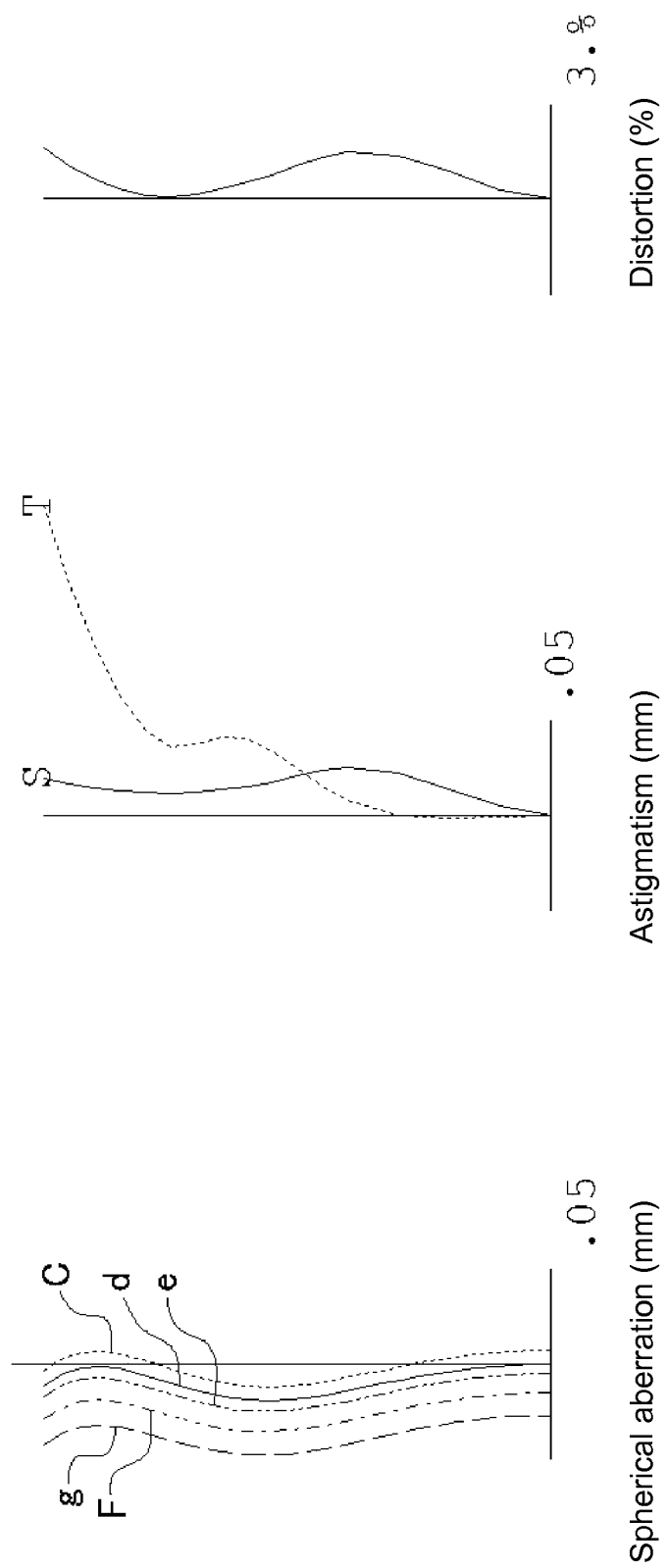
FIG. 6 is an aberration diagram showing a spherical aberration, astigmatism, and a distortion of the imaging lens of FIG. 4.
Figure 7:
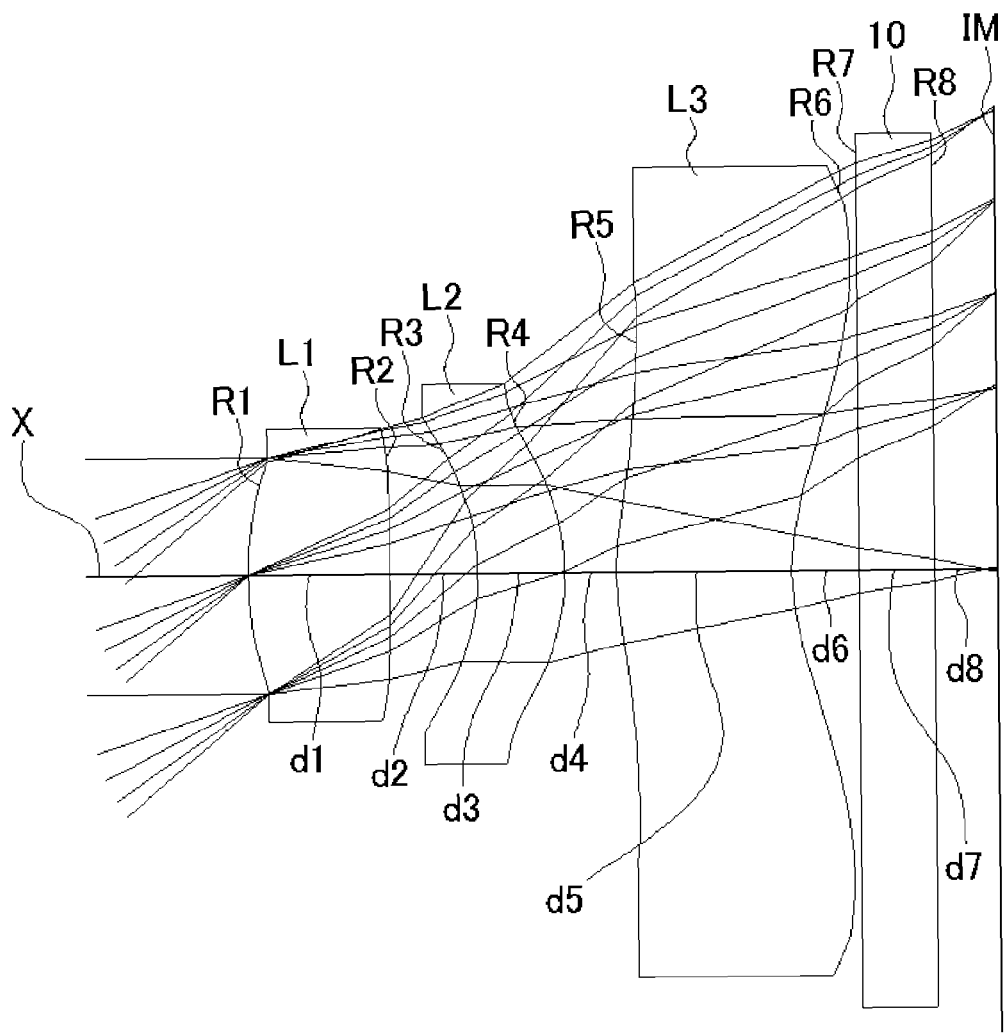
FIG. 7 shows a sectional view of a schematic configuration of an imaging lens in Numerical Data Example 3 according to the embodiment of the invention.

FIG. 5 shows the lateral aberration that corresponds to the image height ratio H of the imaging lens, and FIG. 6 shows a spherical aberration (mm), astigmatism (mm), and a distortion (%), respectively. As shown in FIGS. 5 and 6, according to the imaging lens of Numerical Data Example 2, the aberrations are also satisfactorily corrected.

Numerical Data Example 3

Basic data are shown below.

f=1.50 mm, Fno=2.3, ω=40.6°

Unit: mm

Surface Data

| Surface Number i | R | d | Nd | vd |
|---|---|---|---|---|
| (Object) | ∞ | ∞ | | |
| 1* (Stop) | 0.949 (=R1f) | 0.395 | 1.5351 | 56.1 |
| 2* | −39.146 (=R1r) | 0.246 (=D12) | | |
| 3* | −0.653 | 0.242 | 1.5351 | 56.1 |
| 4* | −0.727 (=R2r) | 0.144 (=D23) | | |
| 5* | 0.777 (=R3f) | 0.489 | 1.5351 | 56.1 |
| 6* | 0.618 | 0.190 | | |
| 7 | ∞ | 0.210 | 1.5163 | 64.1 |
| 8 (Image plane) | ∞ ∞ | 0.174 | | | f1 = 1.74 mm
f2 = 85.40 mm
f3 = 79.59 mm
f23 = 34.36 mm

Aspheric Surface Data

First Surface k = −1.083E+01, $A_4$ = 1.732, $A_6$ = −9.682, $A_8$ = 1.930E+01, $A_{10}$ = 6.887E+01, $A_{12}$ = −2.415E+02

Second Surface k = 0.000, $A_4$ = −3.940E−01, $A_6$ = 1.553, $A_8$ = −4.154E+01, $A_{10}$ = 1.418E+02, $A_{12}$ = −1.844E+02

Third Surface k = −3.111, $A_4$ = −1.856E−01, $A_6$ = −3.083E+01, $A_8$ = 3.817E+02, $A_{10}$ = −2.283E+03, $A_{12}$ = 8.087E+03, $A_{14}$ = −1.621E+04, $A_{16}$ = 1.263E+04

Fourth Surface k = 0.000, $A_4$ = −1.871, $A_6$ = 1.528E+01, $A_8$ = −6.316E+01, $A_{10}$ = 2.572E+02, $A_{12}$ = −3.233E+02, $A_{14}$ = −2.418E+02, $A_{16}$ = 2.873E+02

Fifth Surface k = −1.951E+01, $A_4$ = −7.880E−01, $A_6$ = 2.417, $A_8$ = −4.829, $A_{10}$ = 5.373, $A_{12}$ = −1.829, $A_{14}$ = −9.789E−01

Sixth Surface k = −5.455, $A_4$ = −5.256E−01, $A_6$ = 9.534E−01, $A_8$ = −1.069, $A_{10}$ = 2.983E−01, $A_{12}$ = 4.627E−01, $A_{14}$ = −3.888E−01, $A_{16}$ = 7.672E−02

The values of the respective conditional expressions are as follows:

$f1/f=1.16$ $f2/f3=1.07$ $f1/f23=0.051$ $R2r/R3f=-0.94$ $D23/D12=0.59$ $R1f/R1r=-0.024$

Accordingly, the imaging lens of Numerical Data Example 3 satisfies the above-described conditional expressions (1) to (7). A distance on the optical axis from the object-side surface of the first lens L1 to the image plane IM (length in air) is 2.02 mm, and downsizing of the imaging lens is attained. Here, the respective lenses that compose the imaging lens of Numerical Data Example 3 are also made of the same material and the manufacturing cost of the imaging lens is suitably restrained.

Figure 8:
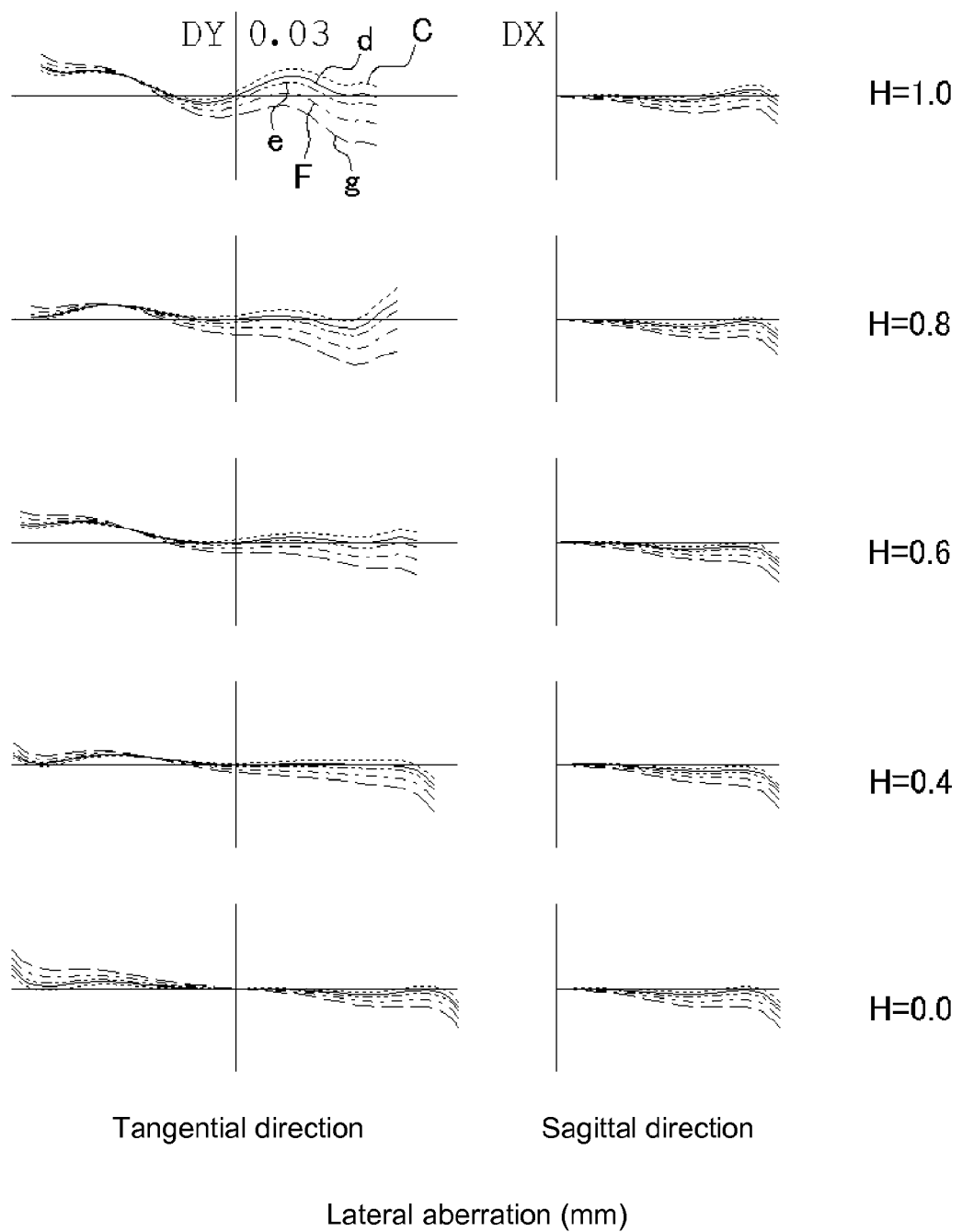
FIG. 8 is an aberration diagram showing a lateral aberration of the imaging lens of FIG. 7.
Figure 9:
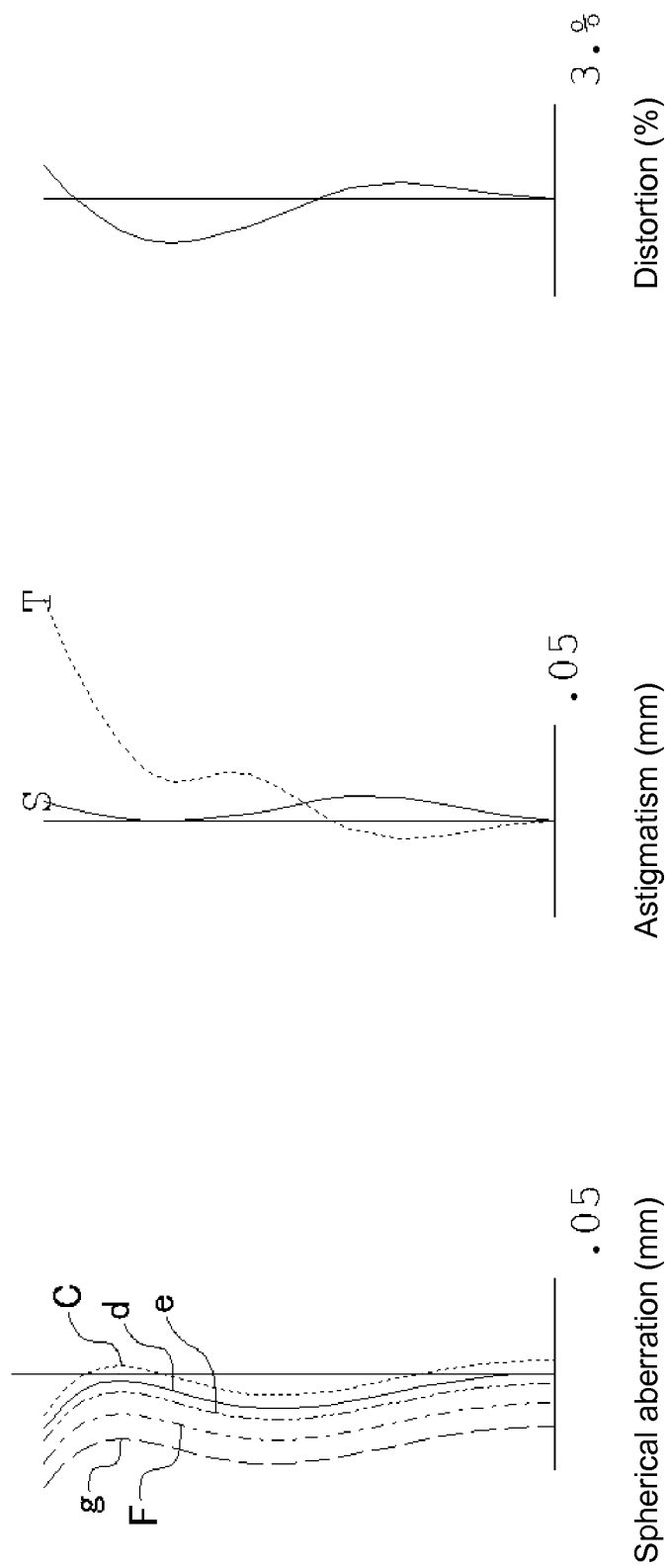
FIG. 9 is an aberration diagram showing a spherical aberration, astigmatism, and a distortion of the imaging lens of FIG. 7.
Figure 10:
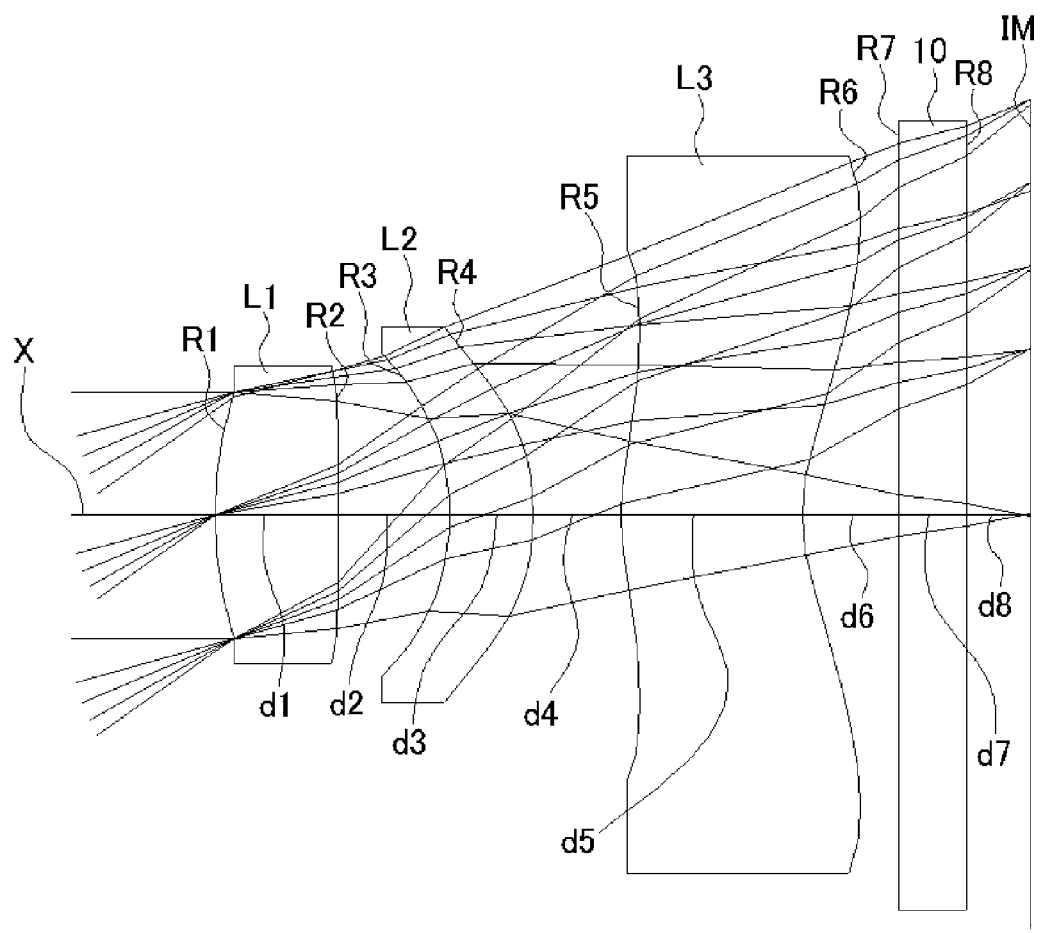
FIG. 10 shows a sectional view of a schematic configuration of an imaging lens in Numerical Data Example 4 according to the embodiment of the invention.

FIG. 8 shows the lateral aberration that corresponds to the image height ratio H of the imaging lens and FIG. 9 shows a spherical aberration (mm), astigmatism (mm), and a distortion (%), respectively. As shown in FIGS. 8 and 9, according to the imaging lens of Numerical Data Example 3, the aberrations are satisfactorily corrected.

Numerical Data Example 4
Basic data are shown below.
f=1.85 mm, Fno=2.4, ω=34.8°

Unit: mm

Surface Data

| Surface Number i | R | d | Nd | vd |
|---|---|---|---|---|
| (Object) | ∞ | ∞ | | |
| 1* (Stop) | 1.263 (=R1f) | 0.379 | 1.5351 | 56.1 |
| 2* | −45.882 (=R1r) | 0.344 (=D12) | | |
| 3* | −0.765 | 0.258 | 1.5351 | 56.1 |
| 4* | −0.833 (=R2r) | 0.273 (=D23) | | |
| 5* | 0.777 (=R3f) | 0.558 | 1.5351 | 56.1 |
| 6* | 0.596 | 0.300 | | |
| 7 | ∞ | 0.210 | 1.5163 | 64.1 |
| 8 | ∞ | 0.194 | | |
| (Image plane) | ∞ | | | | f1 = 2.30 mm
f2 = 54.39 mm
f3 = 64.60 mm
f23 = 24.04 mm

Aspheric Surface Data

First Surface $k = -2.053E+01, A_4 = 1.523, A_6 = -9.771, A_8 = 2.630E+01, A_{10} = 9.158E+01, A_{12} = -5.637E+02$ Second Surface $k = 0.000, A_4 = -2.611E-01, A_6 = 2.934, A_8 = -3.516E+01, A_{10} = 1.444E+02, A_{12} = -2.798E+02$ Third Surface $k = -2.055, A_4 = -1.796E-01, A_6 = -3.095E+01, A_8 = 3.744E+02, A_{10} = -2.302E+03, A_{12} = 8.123E+03, A_{14} = -1.578E+04, A_{16} = 1.322E+04$ Fourth Surface $k = 0.000, A_4 = -2.285, A_6 = 1.334E+01, A_8 = -6.756E+01, A_{10} = 2.465E+02, A_{12} = -3.452E+02, A_{14} = -2.311E+02, A_{16} = 7.899E+02$ Fifth Surface $k = -1.763E+01, A_4 = -8.760E-01, A_6 = 2.492, A_8 = -4.864, A_{10} = 5.280, A_{12} = -1.898, A_{14} = -9.251E-01$ Sixth Surface $k = -6.056, A_4 = -4.947E-01, A_6 = 9.539E-01, A_8 = -1.063, A_{10} = 2.890E-01, A_{12} = 4.546E-01, A_{14} = -3.897E-01, A_{16} = 8.271E-02$ The values of the respective conditional expressions are as follows:

$f1/f=1.24$ $f2/f3=0.84$ $f1/f23=0.096$ $R2r/R3f=-1.07$ $D23/D12=0.79$ $R1f/R1r=-0.028$

Accordingly, the imaging lens of Numerical Data Example 4 satisfies the above-described conditional expressions (1) to (7). A distance on the optical axis from the object-side surface of the first lens L1 to the image plane IM (length in air) is 2.44 mm, and downsizing of the imaging lens is attained. Here, the respective lenses that compose the imaging lens of Numerical Data Example 4 are also made of the same material and the manufacturing cost of the imaging lens is suitably restrained.

Figure 11:
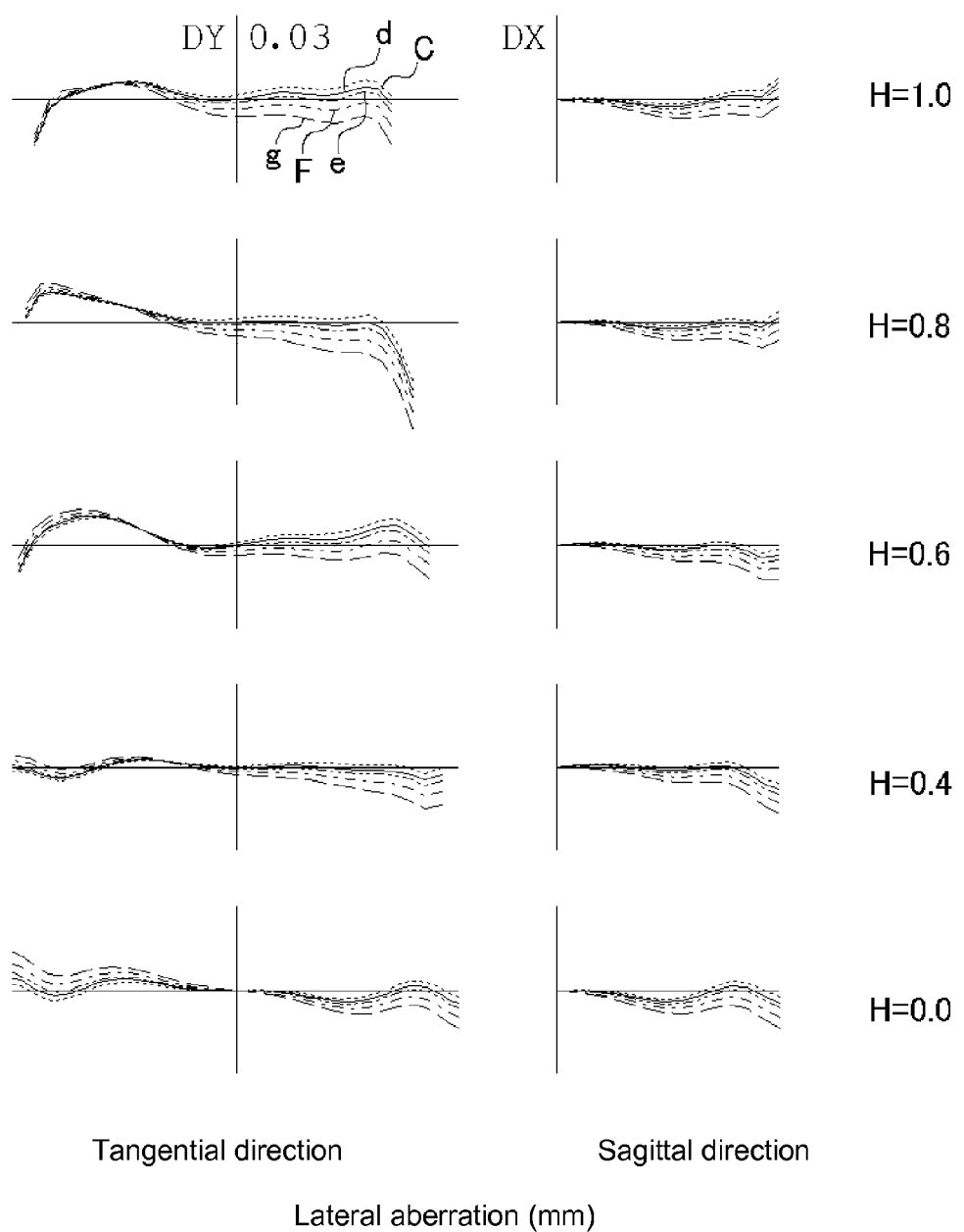
FIG. 11 is an aberration diagram showing a lateral aberration of the imaging lens of FIG. 10.
Figure 12:
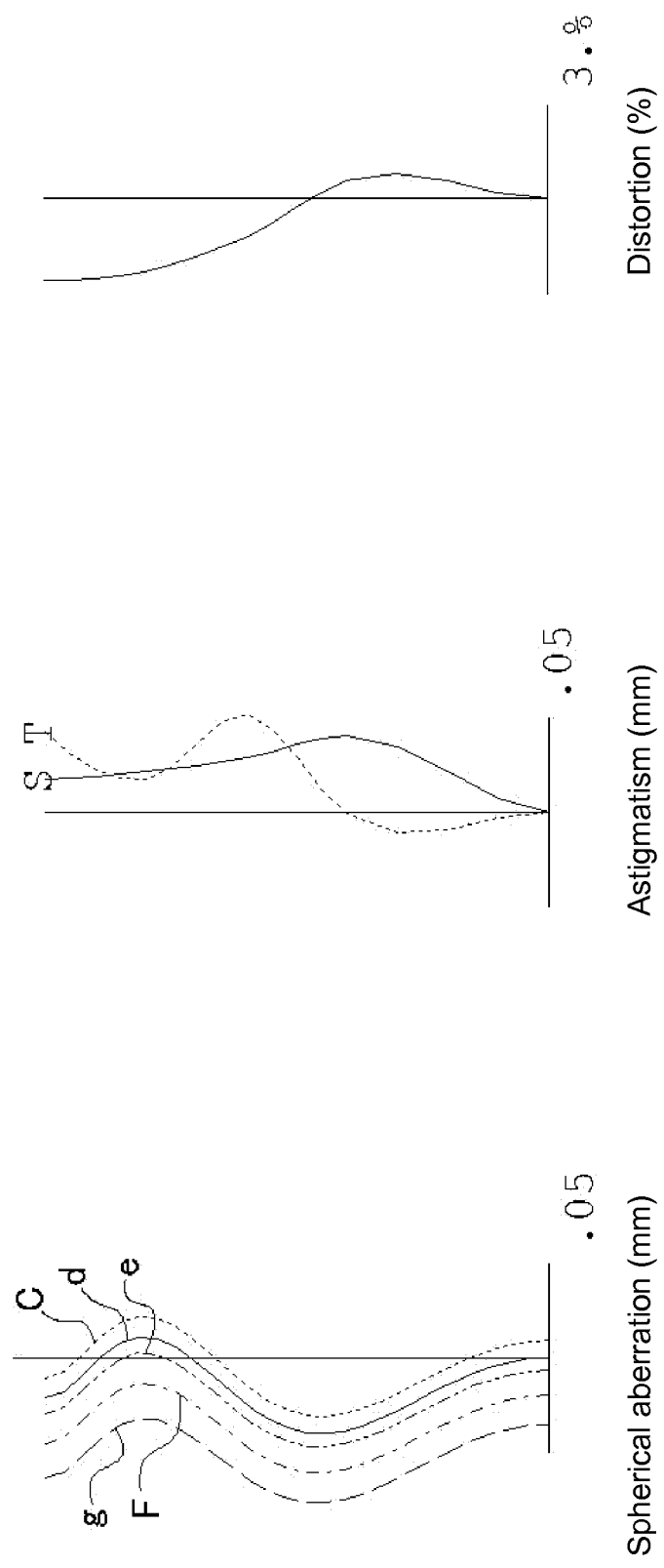
FIG. 12 is an aberration diagram showing a spherical aberration, astigmatism, and a distortion of the imaging lens of FIG. 10.
Figure 13:
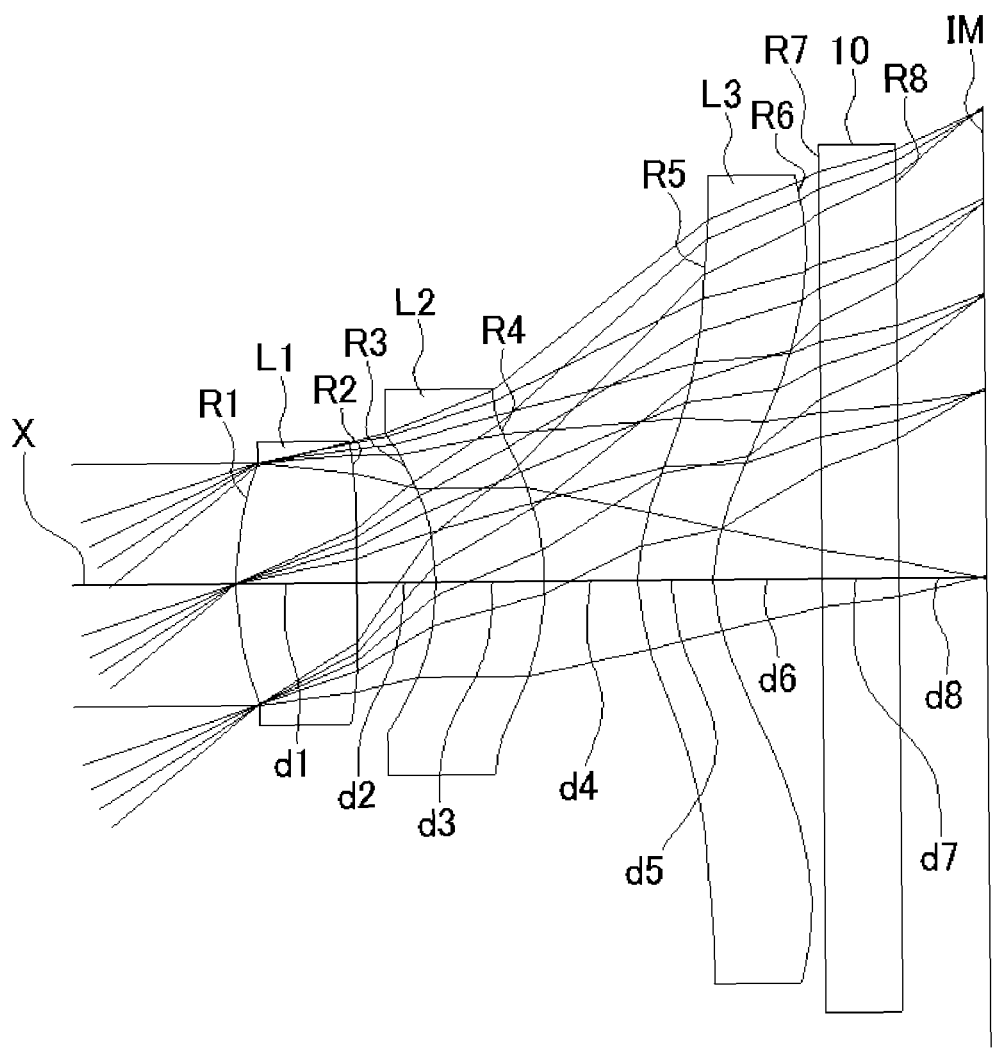
FIG. 13 shows a sectional view of a schematic configuration of an imaging lens in Numerical Data Example 5 according to the embodiment of the invention.

FIG. 11 shows the lateral aberration that corresponds to the image height ratio H of the imaging lens and FIG. 12 shows a spherical aberration (mm), astigmatism (mm), and a distortion (%), respectively. As shown in FIGS. 11 and 12, according to the imaging lens of Numerical Data Example 4, the aberrations are also satisfactorily corrected.

Numerical Data Example 5
Basic data are shown below.
f=1.56 mm, Fno=2.3, ω=39.5°

Unit: mm

Surface Data

| Surface Number i | R | d | Nd | vd |
|---|---|---|---|---|
| (Object) | ∞ | ∞ | | |
| 1* (Stop) | 0.880 (=R1f) | 0.329 | 1.5351 | 56.1 |
| 2* | 84.278 (=R1r) | 0.217 (=D12) | | |
| 3* | −0.703 | 0.298 | 1.5351 | 56.1 |
| 4* | −0.779 (=R2r) | 0.257 (=D23) | | |
| 5* | 0.511 (=R3f) | 0.206 | 1.5351 | 56.1 |
| 6* | 0.448 | 0.300 | | |
| 7 | ∞ | 0.210 | 1.5163 | 64.1 |
| 8 | ∞ | 0.239 | | |
| (Image plane) | ∞ | | | | f1 = 1.66 mm
f2 = 36.54 mm
f3 = 48.02 mm
f23 = 18.01 mm

Aspheric Surface Data

First Surface $k = -9.692, A_4 = 1.634, A_6 = -8.463, A_8 = 3.312E+01, A_{10} = -1.021E+02, A_{12} = 1.954E+01$ Second Surface $k = 0.000, A_4 = -1.502E-01, A_6 = -5.393, A_8 = -7.455, A_{10} = 1.753E+02, A_{12} = -7.763E+02$ Third Surface $k = -1.565, A_4 = -1.394E-01, A_6 = -2.613E+01, A_8 = 3.678E+02, A_{10} = -2.490E+03, A_{12} = 8.554E+03, A_{14} = -6.906E+03, A_{16} = -2.761E+04$ Fourth Surface $k = 0.000, A_4 = -1.057, A_6 = 1.187E+01, A_8 = -6.495E+01, A_{10} = 2.810E+02, A_{12} = -3.047E+02, A_{14} = -4.977E+02, A_{16} = 6.221E+02$ Fifth Surface $k = -2.448, A_4 = -1.301, A_6 = 2.661, A_8 = -4.384, A_{10} = 4.780, A_{12} = -2.619, A_{14} = 5.120E-01$ Sixth Surface $k = -2.230, A_4 = -9.976E-01, A_6 = 1.557, A_8 = -1.408, A_{10} = 2.184E-01, A_{12} = 5.681E-01, A_{14} = -3.095E-01, A_{16} = 1.956E-02$ The values of the respective conditional expressions are as follows:

$f1/f=1.06$ $f2/f3=0.76$ $f1/f23=0.092$ $R2r/R3f=-1.52$ $D23/D12=1.18$ $R1f/R1r=0.010$

Accordingly, the imaging lens of Numerical Data Example 5 satisfies the above-described conditional expressions (1) to (6). A distance on the optical axis from the object-side surface of the first lens L1 to the image plane IM (length in air) is 1.98 mm, and downsizing of the imaging lens is attained.

Figure 14:
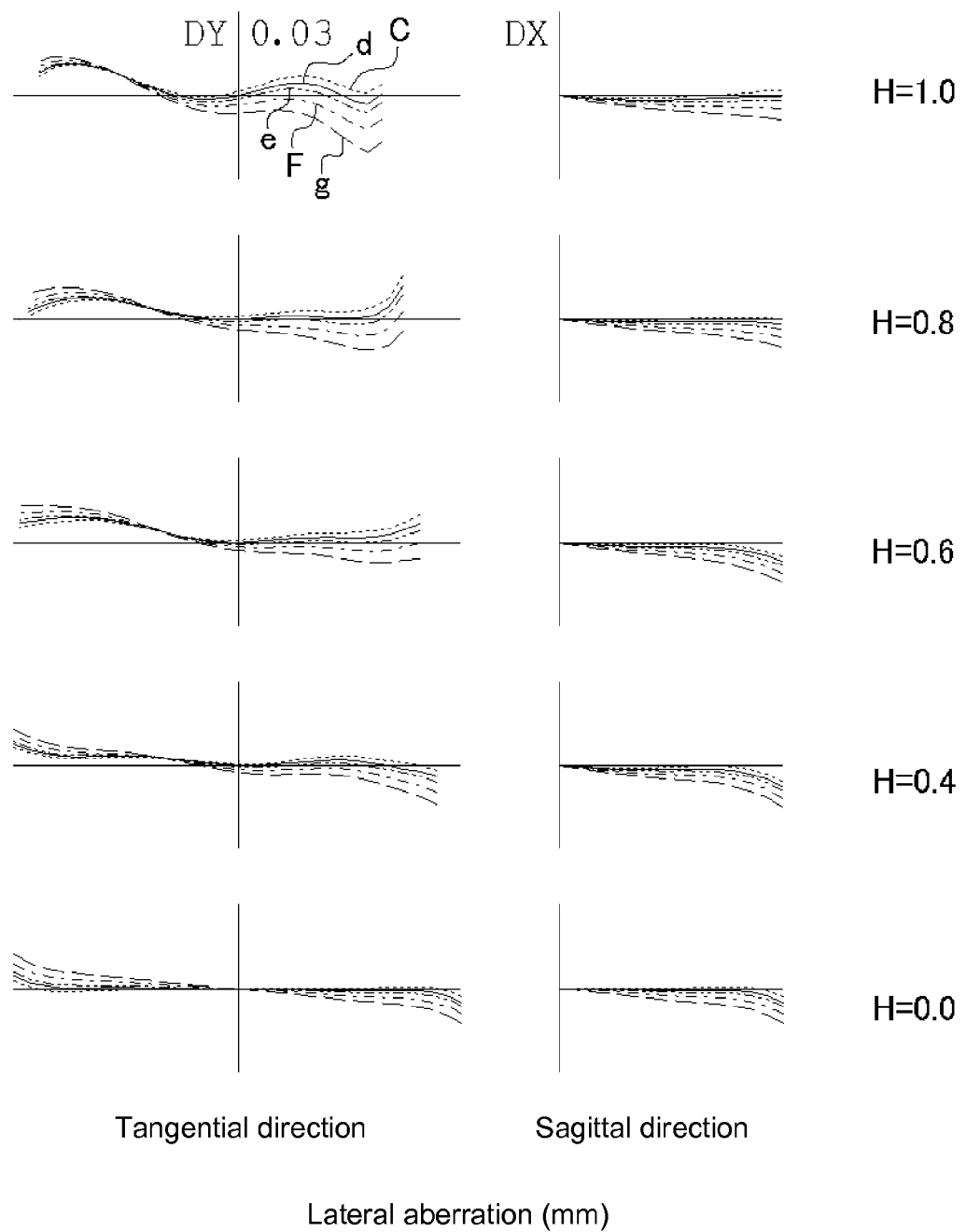
FIG. 14 is an aberration diagram showing a lateral aberration of the imaging lens of FIG. 13.
Figure 15:
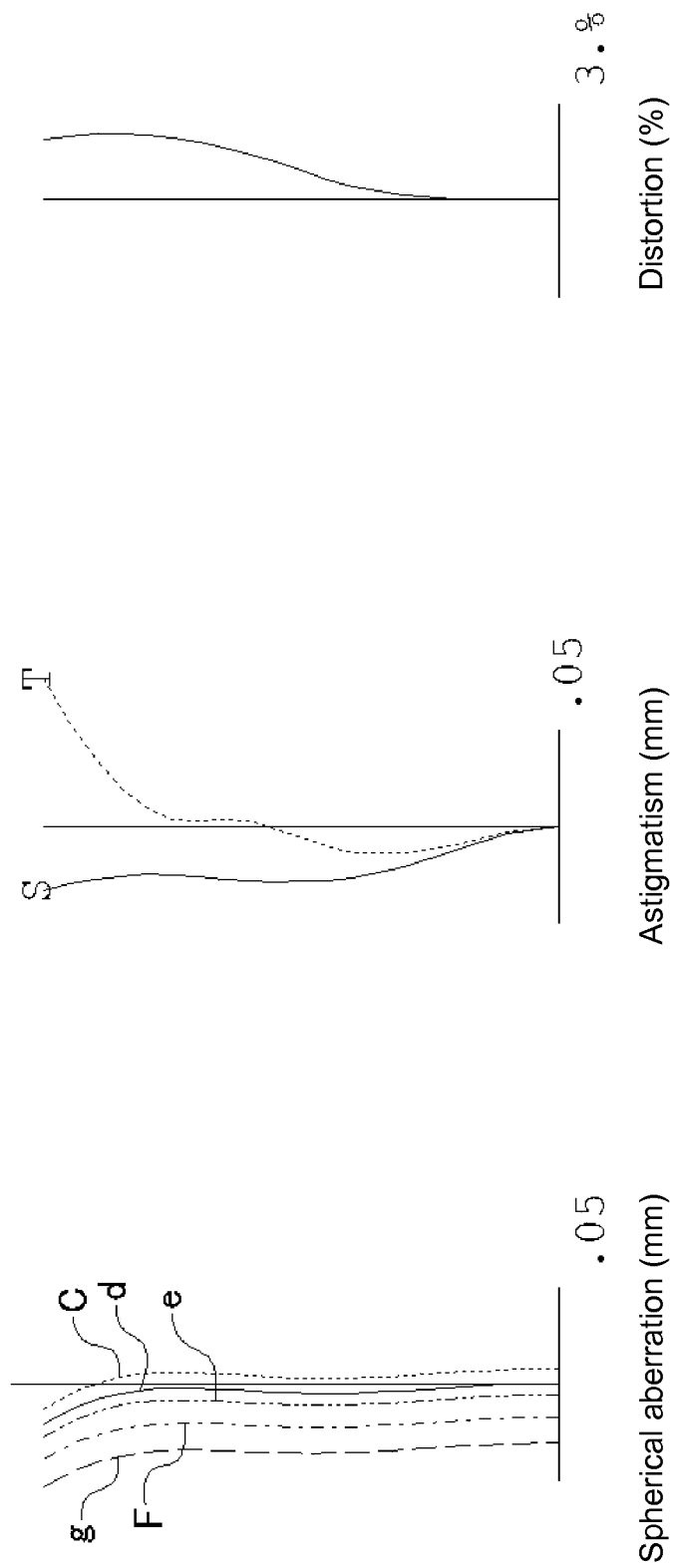
FIG. 15 is an aberration diagram showing a spherical aberration, astigmatism, and a distortion of the imaging lens of FIG. 13.

FIG. 14 shows the lateral aberration that corresponds to the image height ratio H of the imaging lens and FIG. 15 shows a spherical aberration (mm), astigmatism (mm), and a distortion (%), respectively. As shown in FIGS. 14 and 15, according to the imaging lens of Numerical Data Example 5, the aberrations are satisfactorily corrected.

With increasing varieties of functions of cellular phones and smart phones, an imaging lens for mounting in those camera devices are even required to come with wider angle than before. Mounting an imaging lens having a wide angle in a camera, it is not only achievable to take an image of wider range, but also possible to clip an image of desired range out of an image taken in wide range upon fabrication. Since the imaging lens of the embodiment has relatively wide angle of view, it is achievable to fully meet those demands.

Moreover, with advancement in downsizing of cameras, a small-sized imaging element has been mounted in the aforementioned cameras. In case of a small-sized imaging element, since a light-receiving area of each pixel is generally small, there is an issue of a dark image in comparison with an image taken by a large imaging element having the same number of pixels. As a method of solving such problem, there is a method that improves a light receiving sensitivity of an imaging element using an electric circuit. However, when the light receiving sensitivity increases, a noise component that directly does not contributes to the image formation is also amplified, so that it is often necessary to have another electric circuit to reduce or eliminate noises. Since the imaging lens of the embodiment has relatively small F number, it is achievable to obtain sufficiently bright image without such electric circuit or the like. Moreover, because of its small F number, it is possible to obtain a bright image even in relatively dark environment, so that it is possible to provide the imaging lens for use in new applications of cellular phones and smart phones.

According to the imaging lens of the respective Numerical Data Examples, the maximum image height of the image plane IM is 1.285 mm and it is combined with a small-sized imaging element that is smaller than ⅕ inch. By combining the imaging lens of each Numerical Data Example with such small-sized imaging element, it is achievable to suitably restrain the sensitivity (manufacturing errors sensitivity) to deterioration of the image-forming performance due to de-centering (axial displacement), tilting, etc. occurred upon production of the imaging lens.

Accordingly, when the imaging lens of the embodiment or the imaging device equipped with the imaging lens is mounted in a camera such as cellular phones, smart phones, digital still cameras, portable information terminals, security cameras, onboard cameras, and network cameras, it is possible to attain both high functionality and downsizing of the cameras.

The disclosure of Japanese Patent Application No. 2012-040878, filed on Feb. 28, 2012, is incorporated in the application by reference.

While the invention has been explained with reference to the specific embodiments of the invention, the explanation is illustrative and the invention is limited only by the appended claims.

What is claimed is:

1. An imaging lens comprising:
a first lens having positive refractive power;
a second lens having positive refractive power; and
a third lens having positive refractive power, arranged in an order from an object side to an image plane side,
wherein said first lens is formed in a shape so that a surface thereof on the object side is convex,
said second lens is formed in a shape so that a surface thereof on the object side is concave and a surface thereof on the image plane side is convex,
said third lens is formed in a shape so that a surface thereof on the object side is convex and a surface thereof on the image plane side is concave,
said third lens is formed in the shape so that the surface thereof on the object side and the surface thereof on the image plane side are respectively formed as aspheric surfaces having inflexion points,
said first lens has a focal length f1, said second lens has a focal length f2, and said third lens has a focal length f3 so that the following conditional expressions are satisfied:

$f1 < f2$ $1.0 < f1/f < 1.5$ $0.7 < f2/f3 < 1.2$ where f is a focal length of a whole lens system, and
said first lens has the surface on the image plane side situated away from the surface of the second lens on the object side by a distance D12, and said second lens has the surface on the image plane side situated away from the surface of the third lens on the object side by a distance D23 so that the following conditional expression is satisfied:

$0.2 < D23/D12 < 1.2$.

2. The imaging lens according to claim 1, wherein said second lens and said third lens have a composite focal length f23 so that the following conditional expression is satisfied:

$0.02 < f1/f23 < 0.1$.

3. The imaging lens according to claim 1, wherein said second lens has the surface on the image plane side having the curvature radius R2r, and said third lens has the surface on the object side having the curvature radius R3f so that the following conditional expression is satisfied:

$-2.0 < R2r/R3f < -0.8$.

4. The imaging lens according to claim 1, wherein said first lens is formed in the shape so that a surface thereof on the image plane side has a negative curvature radius,
said first lens has the surface on the object side having the curvature radius R1f, and
said first lens has the surface on the image plane side having the curvature radius R1r so that the following conditional expression is satisfied:

$-0.1 < R1f/R1r < -0.01$.

5. The imaging lens according to claim 1, wherein each of said first lens, said second lens, and said third lens has an Abbe's number greater than 50.

6. The imaging lens according to claim 1, wherein each of said first lens, said second lens, and said third lens is formed of a same material.

* * * * *